United States Patent Office 2,846,492
Patented Aug. 5, 1958

2,846,492

ADHESIVES CONTAINING CHLORINATED NATURAL RUBBER, HYPOCHLORINATED NATURAL RUBBER AND WAX

Russell E. Sawyer, East Norwalk, Conn., assignor to R. T. Vanderbilt Company, Inc., New York, N. Y., a corporation of New York No Drawing. Application February 15, 1956
Serial No. 565,540

2 Claims. (Cl. 260—727)

The present invention relates to adhesive compositions, and more particularly to adhesive compositions which are useful in uniting rubber to metallic surfaces.

Various methods are known for uniting rubber to metallic surfaces. For example, one of the known methods involves coating the metal surface with brass plating, applying a coating of rubber cement to the brass plating, and then vulcanizing the rubber while the rubber is in contact with the cement coating. This method has not proved to be entirely satisfactory, however, because it involves a brass plating operation. Another known method involves the coating of the metallic surface with an adhesive composition containing a cement of resin-like or cyclicized rubber derivatives and vulcanizing the rubber layer to the cement layer with an intermediate layer of tie-gum rubber. This method, too, has not proved to be entirely satisfactory since the coating of the brittle rubber derivative is weaker than the adhered rubber compound, so that the rubber to metal bond is not sufficiently strong to resist conditions of shock or impact. Various other methods possess serious drawbacks, such as limitations of the types of rubber, particularly natural rubber and the synthetic rubbers known as GR–S and neoprene, which can be properly adhered.

In U. S. Patent No. 2,637,751, issued May 5, 1953, there is set forth an adhesive composition which can be suitably used for the purpose of uniting rubber to metallic surfaces and which does not suffer from the deficiencies just noted when used. This patented adhesive composition contains chlorinated natural rubber, hypochlorinated natural rubber, suitable organic solvents, carbon tetrachloride, and one or more of a variety of compounds which are useful as rubber antioxidants.

The patented adhesive composition consists essentially of an admixture of at least one compound useful as a rubber antioxidant; chlorinated natural rubber having a chlorine content of about 65% to about 67% by weight; carbon tetrachloride; a solvent phase prepared by milling a natural rubber until the rubber is characterized by a reading within the range from about 17 to about 23 when tested on a Mooney viscosimeter using the large rotor and taking the reading at 12 minutes when operating the viscosimeter at 230° F., dissolving the milled rubber in at least one solvent selected from the group consisting of benzene, toluene, and xylenes to form a solution containing from about 3.5% to about 15% by weight of rubber, reacting such solution with an aqueous solution of hypochlorous acid containing from about 25 to 32 grams per liter of hypochlorous acid to provide an emulsion in which the solids present therein have a chlorine content within the range from about 15% to about 17% by weight, breaking said emulsion by the addition thereto of at least one salt selected from the group consisting of anhydrous calcium chloride and calcium chloride dihydrate and separating the phases formed upon the breaking of said emulsion; and sufficient amount of said solvent as is required to form a final composition having a viscosity of from about 50 to about 130 centipoises at 25° C. and containing hypochlorinated natural rubber within the range from about 10.4% to about 14.2%, based upon the weight of the hypochlorinated rubber and the chlorinated rubber.

As an illustration of the preparation of specific patented compositions, 10.5 pounds of pale crepe rubber was milled until it gave a reading of 20 when tested on a Mooney viscosimeter after which the rubber was dissolved in 200 pounds of 10° xylol. The solution of the rubber in the xylol was prepared by stirring for a period of approximately 12 hours. After this was done, the viscosity of the xylol solution was about 49 centipoises at about 25° C.

In a separate container a solution of sodium hypochlorite was prepared. Thus, 60 pounds of ice was added to 13 pounds of 50% aqueous caustic soda. With stirring, 5 pounds of chlorine was bubbled in, the temperature at all times during the addition of chlorine remaining at 5° C. or below. At the end of the addition of the chlorine and after most of the ice had melted, the cold solution was stirred for 15 minutes and was analyzed in order to determine its content of sodium hypochlorite. The analysis showed that the sodium hypochlorite solution contained 73.3 grams of sodium hypochlorite per liter.

29.2 liters of this solution was taken and diluted with 15 pounds of ice and 45 pounds of water. Then, after the ice had melted, 10% of the entire volume was added to the solution of rubber in xylol as previously described and the entire mixture was stirred, forming an emulsion. Initially, the viscosity of the emulsion was about 49 centipoises at a temperature of about 25° C., and after the mixture had been stirred for about 40 minutes, the viscosity of the emulsion was 14 centipoises under the same temperature conditions.

The remainder of the aqueous solution of sodium hypochlorite was acidified using 5 pounds of glacial acetic acid mixed with 10 pounds of ice. The hypochlorous acid solution thus formed was rapidly added, with stirring, to the emulsion containing the rubber which had been reacted with the sodium hypochlorite.

After stirring for 40 minutes, 200 grams of an oxidation inhibitor, symmetrical di-beta-naphthyl-para-phenylene-diamine, was added and then 100 pounds of calcium chloride dihydrate was added, following which the entire mixture was stirred for an additional 40 minutes, at which time the calcium chloride dihydrate had dissolved. After standing overnight, the emulsion broke, and the top layer containing the solution of the treated rubber in xylol was decanted. This layer analyzed 5.3% by weight of solids and had a viscosity of about 6 centipoises at about 25° C. Also, the aforementioned solids contained 16.5% by weight of chlorine.

One specific patented composition was prepared as follows:

81 parts by weight of the xylol solution containing the treated rubber and the antioxidant was admixed with 40 parts by weight of 10° xylol after which 32 parts by weight of 20 centipoise chlorinated natural rubber containing about 67% by weight of chlorine was added. To the mixture was then added 9 grams of a dye, Sudan Corinth 3B. Finally, 26 parts by weight of carbon tetrachloride was added to provide a finished product which had a viscosity of about 55 centipoises at 25° C.

Further details concerning this patented adhesive composition may be readily obtained by reference to the U. S. Patent No. 2,637,751.

It was found in accordance with the present invention that the above described patented adhesive composition could be greatly improved by the addition thereto of a water-insoluble hydrocarbon wax. The addition of wax thereto reduces the volatility rate of the solvents present in the adhesive. More important, the addition of wax increases the bonding strength of the adhesive composition. With many types of rubber formulations the new adhesive composition containing a wax is so strong that upon testing the rubber to metal bond a large percent of the break occurs in the rubber formulation rather than at the bond. Accordingly, in many instances the bond is stronger than the rubber formulation being bonded to the metallic surface. This clearly demonstrates the remarkable adhesive power of the new adhesive composition containing a wax.

About 5% of a wax is included in the above-described patented adhesive composition, the percent of wax being based upon the solids present therein. Suitable water-insoluble hydrocarbon waxes which may be employed include, for example, paraffin, Syncera, ceresin, and Flexo Wax C Light. The preferred wax is paraffin.

Flexo Wax C Light is a proprietary synthetic, non-crystalline long-chain hydrocarbon wax having the following physical properties: color, cream; melting point, 60–64° C.; flash point, 230–240° C.; specific gravity at 20° C., 0.82; and soluble in hot hydrocarbons, mineral oils, and vegetable oil. Syncera is a proprietary microcrystalline wax consisting of saturated aliphatic hydrocarbons derived from petroleum and characterized by the fineness of its crystals and having the following physical properties:

|  | 155–160° F. | 145–150° F. |
| --- | --- | --- |
| M. P. (A. S. T. M. D-127-30) | 158 | 147.2 |
| F. P. (Open Cup) | 440 | 390 |
| Acidity | 0 | 0 |
| Sp. Gr. at 60/60 | 0.9928 | 0.922 |
| Oil Content percent | 4.2 | 2.2 |
| Color, NPA | 1.5–2 | 1.5–2 |
| Solubility | Chloroform, CCl₄, Hexane | Benzol, |

The novel adhesive composition of the present invention may be prepared by adding a wax directly to the finished patented adhesive composition. However, the adhesive composition may also be prepared by melting a wax in one of the suitable solvents noted above, such as xylol, and then adding it to the finished patented adhesive composition. As a further alternative the wax may be incorporated into the adhesive composition as it is being prepared. The xylol in the patented adhesive composition makes a suitable solvent for the wax.

The adhesive composition is employed as a coating composition. Thus, the metallic object to be coated is first cleaned, particularly of grease, after which the adhesive composition is applied to the metallic object in the form of a thin film, for example, by brushing, by dipping, or by spraying. After the solvents present in the adhesive composition have evaporated, it usually requiring ½ or 1 hour to provide a dry, nontacky film, the rubber formulation to be bonded to the metallic surface is then applied and vulcanization caused to take place. In order that those using the adhesive composition may more readily see to what extent it has been applied to the metallic surface, a dye may be provided in the adhesive composition.

The novel adhesive compositions for uniting rubber to metal will be further illustrated in connection with the following examples.

In Examples 1–6 the following adhesive composition was used to which a wax was added as noted under each of the examples.

Adhesive composition:

| Components: | Parts by weight |
| --- | --- |
| Parlon 15 | 20.0 |
| Parlon 130 | 17.7 |
| Hypo #136 | 95.5 |
| Carbon Tetrachloride | 31.5 |
| Xylol | 47.25 |
| Dye (Sudan Corinth 3B) | 1.0 |

This adhesive composition without the addition of wax thereto has been designated in Examples 1–6 as Adhesive A and serves as a control.

Parlon 15 and Parlon 130 are proprietary chlorinated natural rubbers. Hypo #136 is a hypochlorinated natural rubber containing symmetrical di-beta-naphthyl-para-phenylene-diamine as a rubber antioxidant in a conventional amount.

EXAMPLE 1

The following elastomer formulation was bonded to steel in this example.

Elastomer formulation:

| Components: | Parts by weight |
| --- | --- |
| GR–S 1000 | 100.0 |
| Bondogen | 2.0 |
| Zinc oxide | 5.0 |
| Medium processing channel carbon black | 50.0 |
| Sulfur | 2.0 |
| Altax | 1.5 |
| Cumate | 0.1 |

GR–S 1000 is a synthetic rubber produced from the copolymerization of styrene and butadiene. Bondogen is a proprietary rubber plasticizer consisting of 75% of a sulfonated petroleum product and 25% n-butyl alcohol. Altax is a proprietary rubber accelerator which is benzothiazyl disulfide. Cumate is a proprietary rubber accelerator consisting of copper dimethyl dithiocarbamate.

In this example the wax was added directly to the finished Adhesive A. The elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM (1 HOUR)

| Adhesive | Stress (Pounds Per Square Inch) | Percent Break | |
| --- | --- | --- | --- |
|  |  | In the Rubber | At the Bond |
| Adhesive A | 1,120 | 0 | 100 |
| Adhesive A + 5% Paraffin | 1,360 | 70 | 30 |
| Adhesive A + 5% Syncera | 1,350 | 0 | 100 |

COATED AND DRIED 1 HOUR AT 60% RELATIVE HUMIDITY

| Adhesive A | 660 | 0 | 100 |
| Adhesive A + 5% Paraffin | 900 | 0 | 100 |
| Adhesive A + 5% Syncera | 915 | 0 | 100 |

COATED AND DRIED 16 HOURS AT 60% RELATIVE HUMIDITY

| Adhesive A | 600 | 0 | 100 |
| Adhesive A + 5% Paraffin | 770 | 0 | 100 |
| Adhesive A + 5% Syncera | 680 | 0 | 100 |

EXAMPLE 2

In this example the following elastomer formulation was bonded to steel.

| Components: | Parts by weight |
| --- | --- |
| GR–S rubber | 100.0 |
| Bondogen | 2.0 |
| Zinc oxide | 5.0 |
| Medium processing channel carbon black | 50.0 |
| Sulfur | 2.0 |
| Altax | 1.5 |
| Cumate | 0.1 |

In this example the wax was added directly to the finished Adhesive A. The elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM
(1 HOUR)

| Adhesive | Stress (Pounds Per Square Inch) | Percent Break | |
|---|---|---|---|
| | | In the Rubber | At the Bond |
| Adhesive A | 1,100 | 0 | 100 |
| Adhesive A + 5% Paraffin | 1,310 | 50 | 50 |

EXAMPLE 3

In this example the following elastomer formulation was bonded to steel.

Components: Parts by weight
- GR-S 1000 _____ 100.0
- Bondogen _____ 2.0
- Zinc oxide _____ 5.0
- Medium processing channel carbon black ____ 50.0
- Sulfur _____ 2.0
- Altax _____ 1.5
- Cumate _____ 0.1

In this example the wax was added directly to the finished Adhesive A. The elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM
(1 HOUR)

[Adhesive stored for approximately 2 months prior to making bonded specimens for stress test.]

| Adhesive | Stress (Pounds Per Square Inch) | Percent Break | |
|---|---|---|---|
| | | In the Rubber | At the Bond |
| Adhesive A | 950 | 0 | 100 |
| Adhesive A + 5% Paraffin (Paraffin melted in xylol, then added to the rest of Adhesive A) | 1,200 | 0 | 100 |
| Adhesive A + 5% Paraffin (Paraffin added directly to Adhesive A) | 1,330 | 50 | 50 |

EXAMPLE 4

In this example the elastomer formulation of Example 3 was bonded to steel. The wax was added directly to the finished Adhesive A. The elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM
(1 HOUR)

[Bonded samples stored for approximately 3 months at room temperature prior to stress test.]

| Adhesive | Stress (Pounds Per Square Inch) | Percent Break | |
|---|---|---|---|
| | | In the Rubber | At the Bond |
| Adhesive A | 920 | 0 | 100 |
| Adhesive A + 5% Paraffin | 1,315 | 50 | 50 |

EXAMPLE 5

In this example the following elastomer formulation was bonded to steel.

Components: Parts by weight
- Smoked sheets of natural rubber _____ 100.0
- Reogen _____ 1.0
- Stearic acid _____ 3.0
- Agerite powder _____ 1.0
- Zinc oxide _____ 5.0
- Medium processing channel carbon black ____ 50.0
- Sulfur _____ 3.0
- Altax _____ 1.0

Reogen is a proprietary rubber plasticizer composed of 80% selected mineral oil, 15% sulfonated petroleum product, and 5% n-butyl alcohol. Agerite powder is a proprietary antioxidant which is phenyl-beta-naphthylamine.

In this example the wax was added directly to the finished Adhesive A. The elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM
(1 HOUR)

| Adhesive | Stress (Pounds Per Square Inch) | Percent Break | |
|---|---|---|---|
| | | In the Rubber | At the Bond |
| Adhesive A | 1,540 | 80 | 20 |
| Adhesive A + 5% Paraffin | 1,610 | 80 | 20 |

The following elastomer formulation was bonded to steel using Adhesive A and Adhesive A containing various waxes identified below.

Components: Parts by weight
- GR-S 1000 _____ 100.0
- Bondogen _____ 2.0
- Zinc oxide _____ 5.0
- Medium processing channel carbon black ____ 50.0
- Sulfur _____ 2.0
- Altax _____ 1.5
- Cumate _____ 0.1

The wax in each instance was compounded into the finished adhesive along with the other components. The elastomer formulation was given an A. S. T. M. adhesion press cure of 35 minutes at 307° F.

*A. S. T. M. adhesion to steel (blasted—80 grit)*

COATED AND DRIED 1 HOUR AT 65% RELATIVE HUMIDITY

| Adhesive | Stress (Pounds Per Square Inch) | Percent Break | |
|---|---|---|---|
| | | In the Rubber | At the Bond |
| Adhesive A | 695 | 0 | 100 |
| Adhesive A + 5% Paraffin | 875 | 0 | 100 |
| Adhesive A + 5% Syncera | 890 | 0 | 100 |
| Adhesive A + 5% Ceresin White | 900 | 0 | 100 |
| Adhesive A + 5% Ceresin Yellow | 800 | 0 | 100 |
| Adhesive A + 5% Flexo Wax C Light | 930 | 0 | 100 |

EXAMPLE 6

The following adhesive composition, designated as Adhesive B, was used in this example:

Components: Parts by weight
- Parlon 20 _____ 20.0
- Parlon 130 _____ 17.7
- Hypo #136 _____ 95.5
- Xylol _____ 47.25
- Carbon tetrachloride _____ 31.5
- Dye (Sudan Corinth 3B) _____ 1.0

Parlon 20 is a proprietary chlorinated natural rubber.

The following elastomer formulation was bonded to steel in this example.

Components: Parts by weight
- GS-S 1000 _____ 100.0
- Bondogen _____ 2.0
- Zinc oxide _____ 5.0
- Medium processing channel carbon black ___ 50.0
- Sulfur _____ 2.0
- Altax _____ 1.5
- Cumate _____ 0.1

Various waxes set forth below were compounded into the finished adhesive along with the other components. This elastomer formulation was given an A. S. T. M. adhesion press cure of 35 minutes at 307° F.

*A. S. T. M. adhesion to steel (blasted—80 grit)*

COATED AND DRIED IN AIR CONDITIONED ROOM (1 HOUR)

| Adhesive | Stress (Pounds Per Square Inch) | Percent Break | |
|---|---|---|---|
| | | In the Rubber | At the Bond |
| Adhesive B | 940 | 0 | 100 |
| Adhesive B + 5% Paraffin | 1,325 | 50 | 50 |
| Adhesive B + 5% Syncera | 1,375 | 50 | 50 |

COATED AND DRIED 16 HOURS AT 60-65% RELATIVE HUMIDITY

| Adhesive B | 625 | 0 | 100 |
| Adhesive B + 5% Paraffin | 1,060 | 0 | 100 |
| Adhesive B + 5% Syncera | 960 | 0 | 100 |

From a study of the above examples it may be readily seen that the addition of a wax to the patented adhesive compositions set forth in U. S. Patent No. 2,637,751 has greatly increased the bonding strength thereof and in some instances has even increased the bonding strength to the point where the rubber formulation breaks rather than the bond when the bonded rubber formulation is subjected to stress.

It will be appreciated that many variations and modifications may be made in the rubber to metal adhesive composition of the present invention without departing from the spirit thereof. Accordingly, the adhesive composition of the present invention is to be limited only within the scope of the appended claims.

I claim:

1. An adhesive composition which is useful in the uniting of rubber to metal surfaces consisting essentially of an admixture of at least one compound useful as a rubber antioxidant; chlorinated natural rubber having a chlorine content of about 65% to about 67% by weight; carbon tetrachloride; a water-insoluble hydrocarbon wax; a solvent phase prepared by milling a natural rubber until the rubber is characterized by a reading within the range from about 17 to about 23 when tested on a Mooney viscosimeter using the large rotor and taking the reading at 12 minutes when operating the viscosimeter at 230° F., dissolving the milled rubber in at least one solvent selected from the group consisting of benzene, toluene, and xylenes to form a solution containing from about 3.5% to about 15% by weight of the rubber, reacting such solution with an aqueous solution of hypochlorous acid containing from about 25 to about 32 grams per liter of hypochlorous acid to provide an emulsion in which the solids present therein have a chlorine content within the range from about 15% to about 17% by weight, breaking said emulsion by the addition thereto of at least one salt selected from the group consisting of anhydrous calcium chloride and calcium chloride dihydrate and separating the phases formed upon the breaking of said emulsion; and sufficient amount of said solvent as is required to form a final composition having a viscosity of from about 50 to about 130 centipoises at 25° C. and containing hypochlorinated natural rubber within the range from about 10.4% to about 14.2%, based upon the weight of the hypochlorinated natural rubber and the chlorinated natural rubber; said wax constituting about 5% by weight of the adhesive composition based upon the weight of the solids present therein.

2. An adhesive composition as set forth in claim 1 wherein the wax is paraffin.

References Cited in the file of this patent

UNITED STATES PATENTS

| 1,222,967 | Meade | Apr. 17, 1917 |
| 1,815,998 | Witherspoon | July 28, 1931 |
| 2,637,751 | Brooks | May 5, 1953 |